US012360471B2

(12) United States Patent
Nakai

(10) Patent No.: US 12,360,471 B2
(45) Date of Patent: Jul. 15, 2025

(54) PROCESS CARTRIDGE AND IMAGE FORMING APPARATUS INCORPORATING THE SAME

(71) Applicant: Hiroshi Nakai, Kanagawa (JP)

(72) Inventor: Hiroshi Nakai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/407,462

(22) Filed: Jan. 9, 2024

(65) Prior Publication Data

US 2024/0231253 A1 Jul. 11, 2024

(30) Foreign Application Priority Data

Jan. 10, 2023 (JP) ................................ 2023-001656

(51) Int. Cl.

*G03G 15/02* (2006.01)
*G03G 21/00* (2006.01)
*G03G 21/18* (2006.01)

(52) U.S. Cl.

CPC ..... *G03G 15/0216* (2013.01); *G03G 21/0035* (2013.01); *G03G 21/1814* (2013.01); *G03G 2221/0005* (2013.01)

(58) Field of Classification Search

CPC ........... G03G 15/0216; G03G 21/0035; G03G 21/1814; G03G 2221/0005; G03G 15/0225; G03G 15/0233

See application file for complete search history.

(56) References Cited

U.S. PATENT DOCUMENTS 7,072,604 B2 * 7/2006 Miura ................ G03G 15/0233 399/176
10,514,651 B1 12/2019 Watanabe et al.
2002/0106212 A1 * 8/2002 Amemiya .......... G03G 21/0035 399/100

(Continued)

FOREIGN PATENT DOCUMENTS

JP 2004-309656 A 11/2004
JP 2005-004070 A 1/2005

(Continued)

*Primary Examiner* — Sandra Brase
(74) *Attorney, Agent, or Firm* — XSENSUS LLP

(57) ABSTRACT

A process cartridge includes an electrostatic latent image bearer, a charging roller, and a brush roller. The charging roller charges the electrostatic latent image bearer and includes a conductive support and a resin layer covering the conductive support and defining an outermost surface layer of the charging roller The brush roller cleans the charging roller and includes fiber bristles. The charging roller and the brush roller satisfy the following relational expressions 1 and 2:

$$100 < X < 600 \quad \text{Expression 1}$$

$$0.2 < Y < 0.6 \quad \text{Expression 2}$$

where X is a product of a fineness (deniers) and a density (kF/inch$^2$) in the fiber bristles, and Y is a value obtained by dividing a biting amount (mm) of the brush roller with respect to the charging roller by an average of fiber lengths (mm) of the fiber bristles.

11 Claims, 8 Drawing Sheets

(56) References Cited

U.S. PATENT DOCUMENTS

| | | | | |
|---|---|---|---|---|
| 2003/0044196 | A1* | 3/2003 | Amemiya .......... | G03G 15/0225 399/100 |
| 2005/0019057 | A1 | 1/2005 | Mizusawa | |
| 2007/0122180 | A1* | 5/2007 | Miyaji ............... | G03G 15/0225 399/176 |
| 2007/0196123 | A1* | 8/2007 | Mizuishi ............ | G03G 15/0225 399/176 |
| 2015/0234343 | A1* | 8/2015 | Ishida ................ | G03G 21/0076 399/346 |
| 2020/0249618 | A1* | 8/2020 | Nakano .............. | G03G 21/0035 |
| 2020/0292982 | A1* | 9/2020 | Kuribayashi ...... | G03G 15/6585 |

FOREIGN PATENT DOCUMENTS

| | | | |
|---|---|---|---|
| JP | 2007-072398 | A | 3/2007 |
| JP | 2007-155844 | A | 6/2007 |
| JP | 2011-029292 | A | 2/2011 |

* cited by examiner

PROCESS CARTRIDGE AND IMAGE FORMING APPARATUS INCORPORATING THE SAME

CROSS-REFERENCE TO RELATED APPLICATION

This patent application is based on and claims priority pursuant to 35 U.S.C. § 119(a) to Japanese Patent Application No. 2023-001656, filed on Jan. 10, 2023, in the Japan Patent Office, the entire disclosure of which is hereby incorporated by reference herein.

BACKGROUND

Technical Field

Embodiments of the present disclosure relate to a process cartridge and an image forming apparatus incorporating the process cartridge.

Related Art

In the image forming apparatus, a demand for high image quality and high definition of an image has been increased, and a toner having a small particle diameter and a spherical shape has been used. Such toner is densely adhered to an electrostatic latent image. The image forming apparatus includes a charger and a cleaner made of a brush or a foam to clean the toner adhering to the charger.

SUMMARY

This specification describes an improved process cartridge that includes an electrostatic latent image bearer, a charging roller, and a brush roller. The charging roller charges the electrostatic latent image bearer and includes a conductive support and a resin layer covering the conductive support and defining an outermost layer of the charging roller. The brush roller cleans the charging roller and includes fiber bristles. The charging roller and the brush roller satisfy the following relational expressions 1 and 2:

$$100 < X < 600 \quad \text{Expression 1}$$

$$0.2 < Y < 0.6 \quad \text{Expression 2}$$

where X is a product of a fineness (deniers) and a density (kF/inch$^2$) in the fiber bristles, and Y is a value obtained by dividing a biting amount (mm) of the brush roller with respect to the charging roller by an average of fiber lengths (mm) of the fiber bristles.

This specification also describes an image forming apparatus including the process cartridge.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
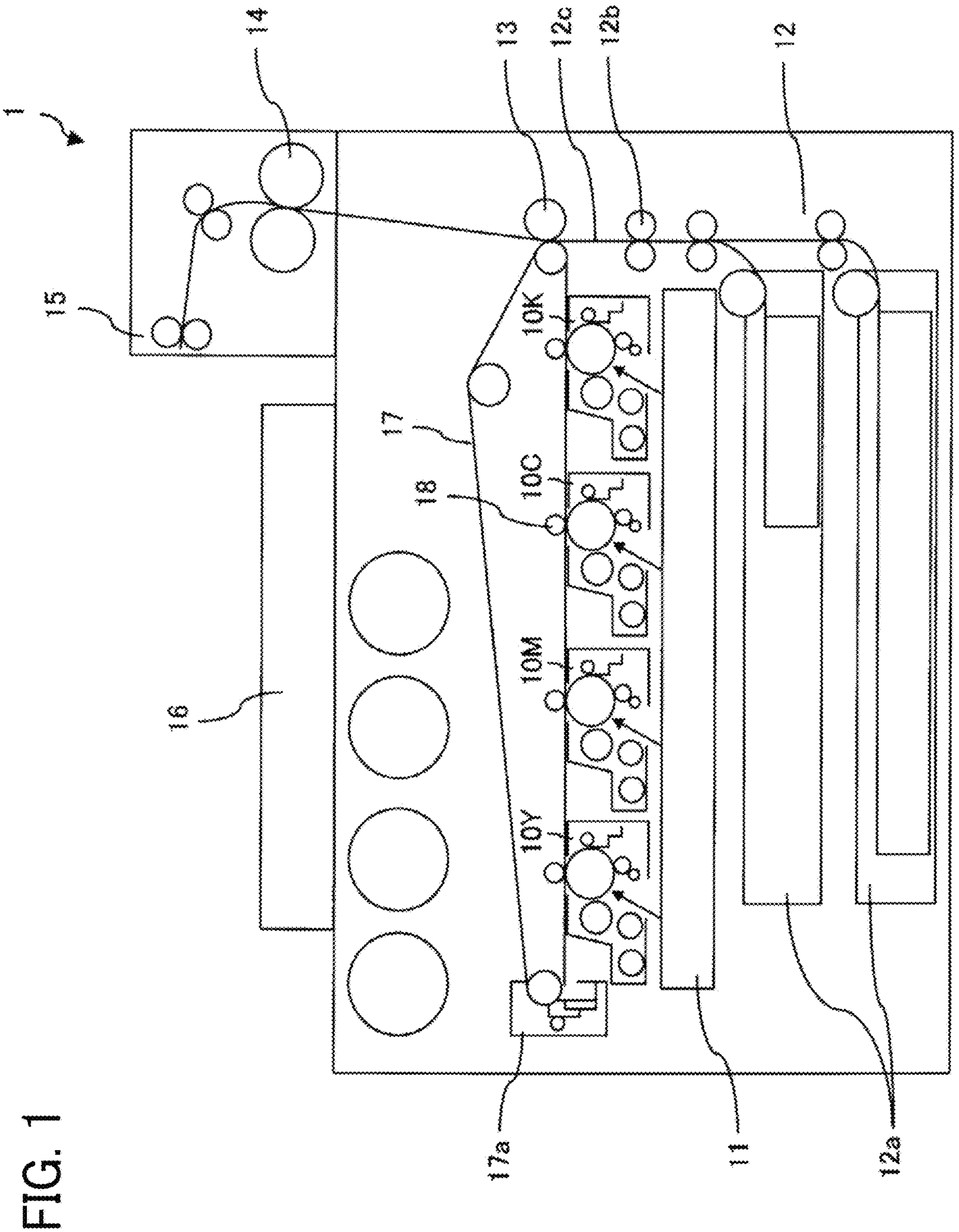
FIG. 1 is a schematic diagram illustrating an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a," "an," and "the" are intended to include the plural forms as well, unless the context clearly indicates otherwise.

A description is provided of an image forming apparatus according to the present disclosure with reference to drawings. It is to be noted that the present disclosure is not to be considered limited to the following embodiments but can be changed within the range that can be conceived of by those skilled in the art, such as other embodiments, additions, modifications, deletions, and the scope of the present disclosure encompasses any aspect, as long as the aspect achieves the operation and advantageous effect of the present disclosure.

Features of the present disclosure are as follows.

A process cartridge includes an electrostatic latent image bearer, a charging roller, and a brush roller. The charging roller charges the electrostatic latent image bearer and includes a conductive support and a resin layer covering the conductive support and defining an outermost layer of the charging roller. The brush roller cleans the charging roller and includes fiber bristles. The charging roller and the brush roller satisfy the following relational expressions 1 and 2:

$$100 < X < 600 \quad \text{Expression 1}$$

$$0.2 < Y < 0.6 \quad \text{Expression 2}$$

where X is a product of a fineness (deniers) and a density (kF/inch$^2$) in the fiber bristles, and Y is a value obtained by dividing a biting amount (mm) of the brush roller with respect to the charging roller by an average of fiber lengths (mm) of the fiber bristles.

Figure 2:
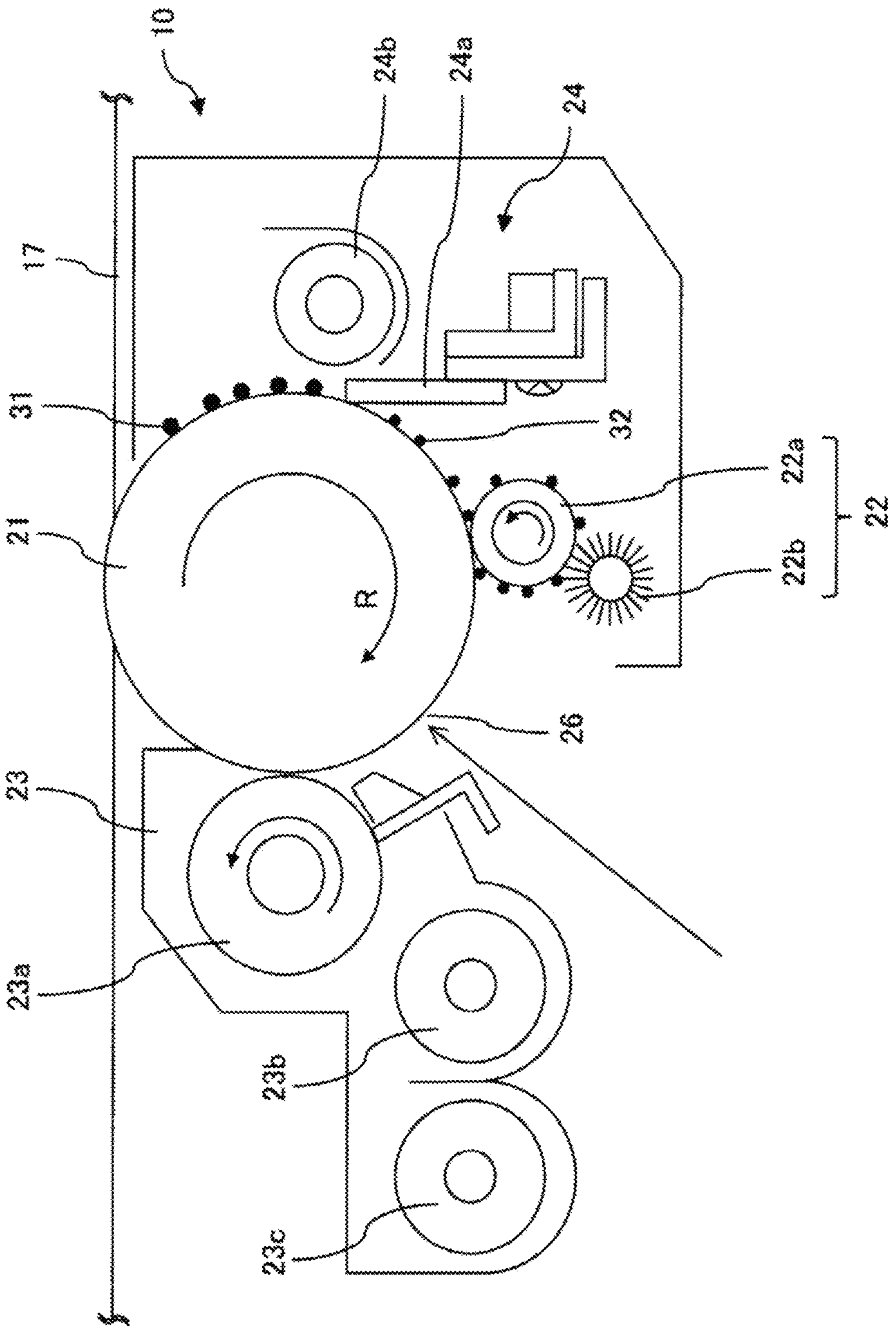
FIG. 2 is a schematic diagram illustrating a configuration of a process cartridge installed in the image forming apparatus of FIG. 1.

FIG. 1 is a schematic diagram illustrating a configuration of an image forming apparatus 1 according to an embodiment of the present disclosure. FIG. 2 is a schematic diagram illustrating a configuration of a process cartridge installed in the image forming apparatus of FIG. 1. The image forming apparatus 1 of the present embodiment is a tandem type image forming apparatus including the four process cartridges. However, embodiments of the present disclosure is not limited to this. For example, the number of process cartridges may be changed as appropriate.

The image forming apparatus 1 includes a sheet feeder 12, process cartridges 10K, 10C, 10M, and 10Y, an exposure device 11, an intermediate transfer belt 17, and a fixing device 14 as illustrated in FIG. 1. When the process cartridges 10K, 10C, 10M, and 10Y are described without distinction, each of them is simply referred to as the process cartridge 10.

As illustrated in FIG. 2, the process cartridge 10 includes a photoconductor 21, a charger 22, a developing device 23, and a photoconductor cleaner 24. The charger 22, the developing device 23, and the photoconductor cleaner 24 are disposed along the outer periphery of the photoconductor 21.

The photoconductor 21 has a drum shape and serves as an electrostatic latent image bearer. The photoconductor 21 is an example of an image bearer. The photoconductor 21 bears an electrostatic latent image. The electrostatic latent image may be referred to as a latent image. The photoconductor 21 rotates in a rotation direction R indicated by an arrow R in FIG. 2.

The charger 22 charges the surface of the photoconductor 21 to a predetermined potential. The charger 22 includes a charging roller 22*a* and a brush roller 22*b*. The charging roller 22*a* serves as a charging member and is disposed to face the photoconductor 21 with a space (in other words, a gap) from the photoconductor 21. The brush roller 22*b* serves as a cleaner to clean the charging roller 22*a* and is disposed so as to contact the charging roller 22*a* on a surface opposite to a surface of the charging roller 22*a* that faces the photoconductor 21. The brush roller 22*b* removes dirt from the charging roller 22*a*.

The developing device 23 supplies toner in a developer including carrier and toner to the photoconductor 21. The developing device 23 includes a developing roller 23*a* and stirrers 23*b* and 23*c*. The developing roller 23*a* serves as a developing member and applies toner to the surfaces of the photoconductors 21. The stirrers 23*b* and 23*c* stir the developer and supply the developer to the developing roller 23*a*.

The photoconductor cleaner 24 includes a cleaning blade 24*a* and a waste toner conveyor 24*b*. In the photoconductor cleaner 24, the cleaning blade 24*a* scrapes off residual toner 31 on the photoconductor 21, and the waste toner conveyor 24*b* conveys and collects the scraped residual toner 31.

The process cartridge 10 may include a discharger. The discharger is disposed between the photoconductor cleaner 24 and the charger 22.

The exposure device 11 exposes the photoconductor 21. The exposure device 11 emits laser light based on image data to form an image. The exposure device 11 irradiates the surface of the photoconductor 21 between the charger 22 and the developing device 23 with the laser light. A portion on the photoconductor 21 irradiated with the laser light is referred to as an optical writing portion 26.

The intermediate transfer belt 17 is stretched between a driving roller and a driven roller. An intermediate transfer belt cleaner 17*a* is disposed so as to face the driving roller. The intermediate transfer belt cleaner 17*a* cleans the intermediate transfer belt 17.

The sheet feeder 12 includes multiple sheet trays 12*a*. The sheet tray 12*a* stores recording media. The recording medium may be referred to as a medium, a print medium, a medium, or the like. As the recording medium, for example, a sheet is used.

Image forming processes in the image forming apparatus 1 according to the present embodiment are described below.

In the process cartridge 10, the charger 22 charges the photoconductor 21, and the exposure device 11 irradiates the photoconductor 21 with the laser light. As a result, the electrostatic latent image is formed on the photoconductor 21. The electrostatic latent image moves to the position facing the developing device 23 with the rotation of the photoconductor 21, and the developing device 23 applies toner to the electrostatic latent image to form a toner image (which may be referred to as a visible image). The toner image is primarily transferred to the intermediate transfer belt 17 by a primary transfer device 18.

The above-described primary transfer is performed in each of the process cartridges 10K, 10C, 10M, and 10C. In the image forming apparatus 1 according to the present embodiment, four color toner images are superimposed on the intermediate transfer belt 17 to form a full-color toner image. However, an image formed by the image forming apparatus according to embodiments of the present disclosure is not limited to the full-color toner image.

A secondary transfer device 13 collectively transfers the full-color toner image formed on the intermediate transfer belt 17 onto a sheet fed from any one of the sheet trays 12*a* in the sheet feeder 12. A registration roller pair 12*b* sends the sheet to a vertical conveyance path 12*c* so that the sheet coincides with the arrival of the full-color toner image on the intermediate transfer belt 17.

The fixing device 14 applies heat and pressure to the full-color toner image transferred onto the sheet to fix the full-color toner image onto the sheet, and an output device 15 ejects the sheet to an output tray 16.

After the toner image is primarily transferred, the photoconductor cleaner 24 cleans the surface of the photoconductor 21 to remove residual toner 31, which is not transferred from the photoconductor 21 to the intermediate transfer belt 17 and remains on the surface of the photoconductor 21, from the surface of the photoconductor 21. In the photoconductor cleaner 24, the cleaning blade 24*a* scrapes off the residual toner 31 on the photoconductor 21, and the waste toner conveyor 24*b* conveys and collects the scraped residual toner 31. The discharger removes electric charge from surface of the photoconductor 21 if it is needed.

In this way, the toner image is formed on the recording medium. The image formation may be referred to as printing, or letter printing.

Figure 3:
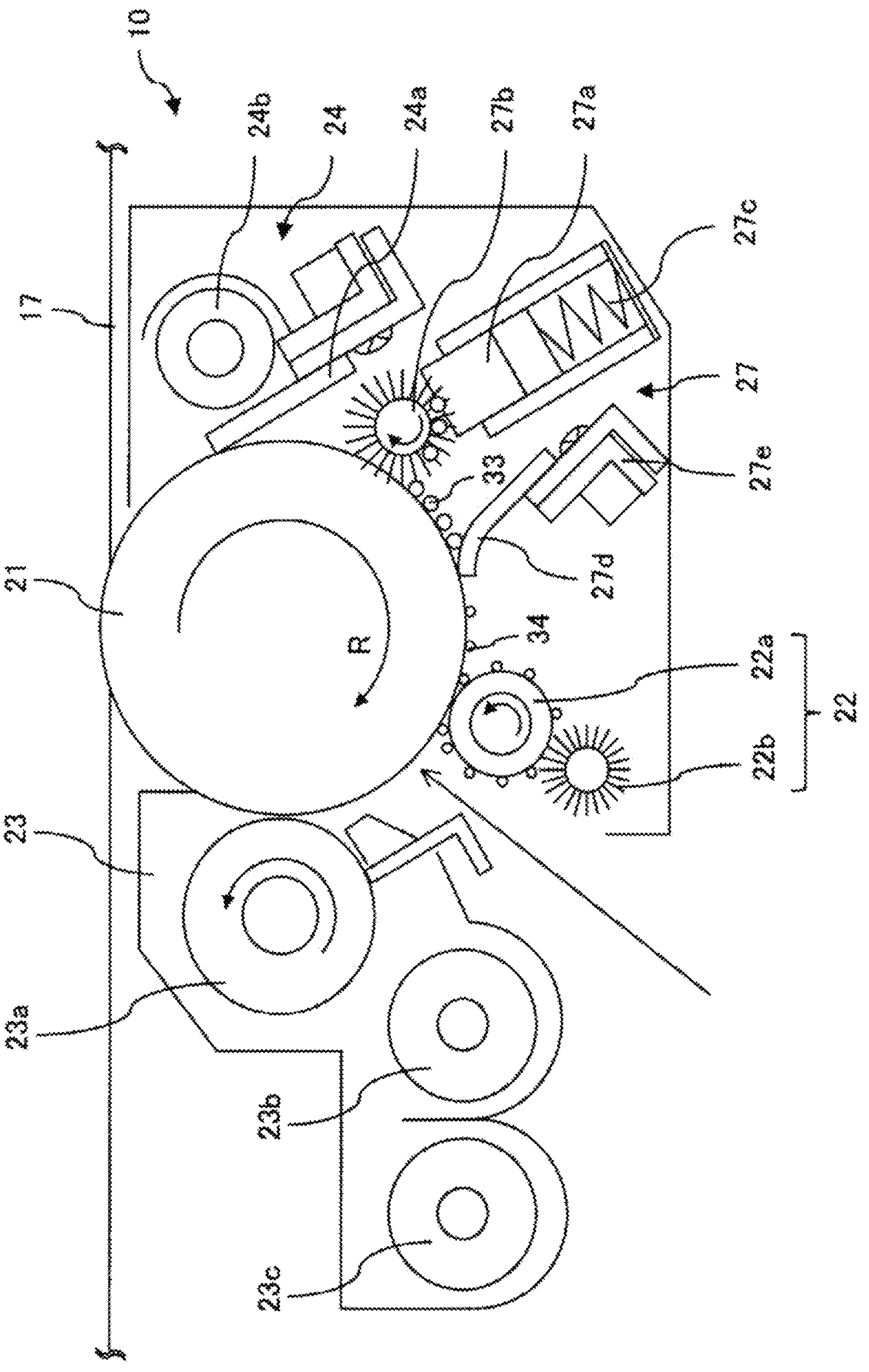
FIG. 3 is a schematic diagram illustrating a process cartridge having a configuration different from the configuration of the process cartridge in FIG. 2.

FIG. 3 is a schematic diagram illustrating the process cartridge 10 having a configuration different from the configuration of the process cartridge of FIG. 2. The process cartridge 10 in FIG. 3 includes a lubrication device 27. The lubrication device 27 enhances the cleaning performance to clean the photoconductor 21 and the transferability.

The lubrication device 27 is disposed downstream from the photoconductor cleaner 24 in the rotation direction R of the photoconductor 21 to stably apply the lubricant. Disposing the lubrication device 27 downstream from the photoconductor cleaner 24 enables applying the lubricant to the surface of the photoconductor 21 after the residual toner is removed. As a result, the lubrication device 27 can stably apply the lubricant to the surface of the photoconductor 21. The lubricant is not particularly limited. For example, zinc stearate may be used as the lubricant.

The lubrication device 27 includes, for example, a lubricant application brush 27*b*. The lubricant application brush 27*b* rotates and scrapes off the lubricant 27*a* to supply lubricant 33 to the surfaces of the photoconductors 21. In FIG. 3, the lubricant 33 is supplied to the photoconductor 21 by the lubrication device 27. A leveling blade 27*d* adjusts the thickness and application area of the lubricant 33 supplied to the photoconductor 21 to form lubricant 34 having a target thickness and a target application area. The leveling blade 27*d* is held by the holder 27*e*.

The lubrication device 27 may include a spring 27*c*. The spring 27*c* applies a biasing force to the lubricant 27*a* to urge the lubricant 27*a* toward the lubricant application brush 27*b*.

As illustrated in FIGS. 2 and 3, the brush roller 22*b* in the image forming apparatus according to the present embodiment cleans the charging roller 22*a*. As illustrated in FIG. 2, the residual toner 32 that has not been removed by the photoconductor cleaner 24 may adhere to the charging roller 22*a*, and the brush roller 22*b* removes the residual toner 32 adhering to the charging roller 22*a*. In addition, as illustrated in FIG. 3, the lubricant 34 applied to the photoconductor 21 by the lubrication device 27 may adhere to the charging roller 22*a*, and the brush roller 22*b* removes the lubricant 34 adhering to the charging roller 22*a*.

Figure 4:
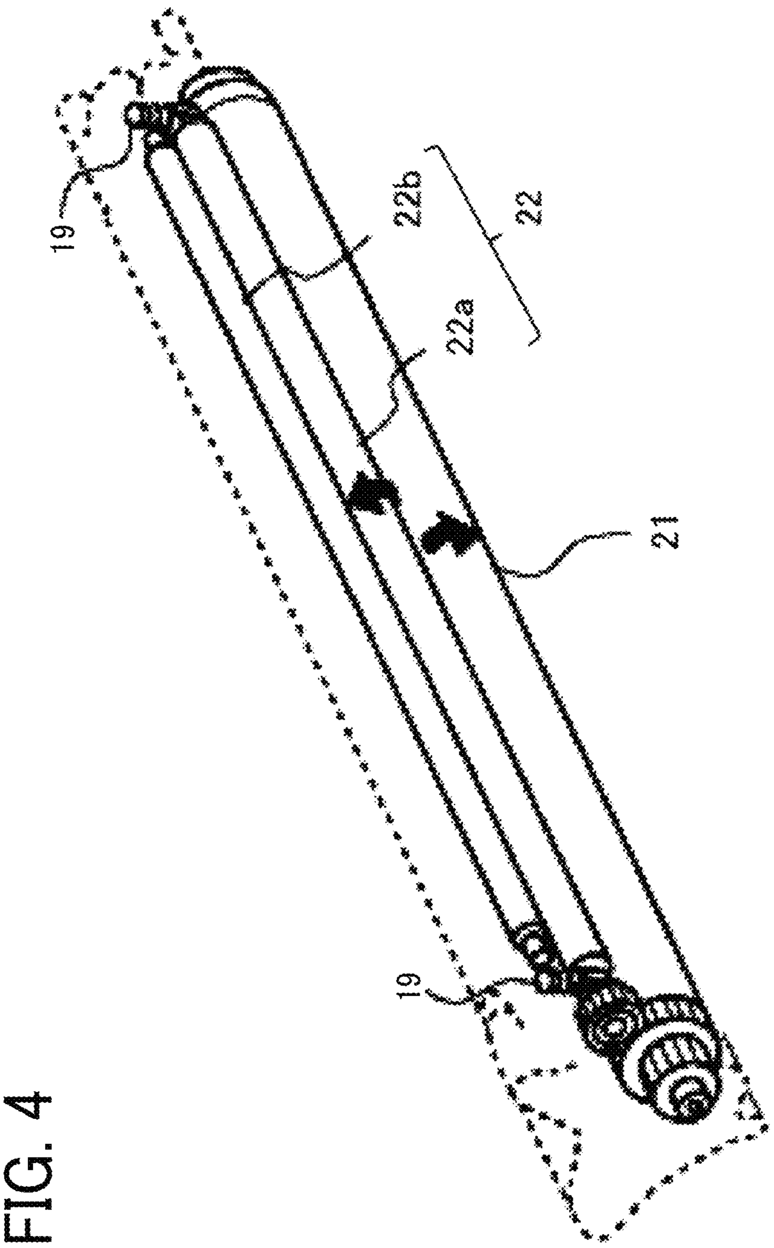
FIG. 4 is a schematic perspective view of a charger according to an embodiment of the present disclosure.

FIG. 4 is a schematic perspective view of the charger 22 in the present embodiment. The brush roller 22*b* in FIG. 4 includes fiber bristles (also referred to as brush fibers), which are schematically illustrated in FIG. 4.

The charger 22 in the present example includes a pressure springs 19 as biasing members. The pressure springs 19 press both ends of the charging roller 22*a* toward the photoconductor 21. The charging roller 22*a* may be in contact with the photoconductor 21, but in the present embodiment, the charging roller 22*a* is disposed to have a minute gap between the charging roller 22*a* and photoconductor 21.

The method to set the minute gap may be appropriately selected. For example, a spacer having a certain thickness may be wound around each of both ends of the charging roller 22*a* that are non-image forming regions. Bringing the surface of the spacer in contact with the surface of the photoconductor 21 forms the minute gap between the charging roller 22*a* and the photoconductor 21.

Figure 5:
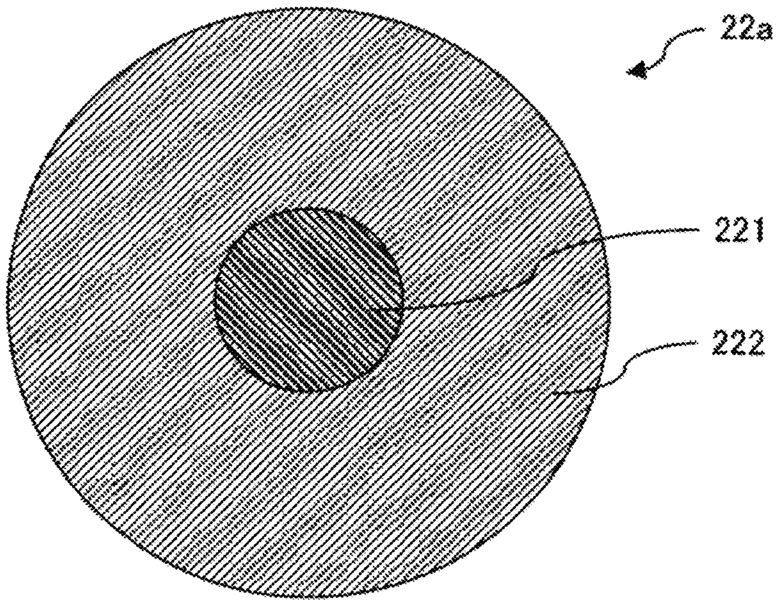
FIG. 5 is a schematic sectional view of a charging roller in the charger of FIG. 4.

FIG. 5 is a schematic sectional view of the charging roller 22*a* in the present embodiment. The charging roller 22*a* includes a core 221 and a resistance adjusting layer 222. The core 221 serves as a conductive support and has a cylindrical shape. The resistance adjusting layer 222 is made of resin and covers the core 221 as the conductive support.

The resistance adjusting layer 222 on the outer circumferential surface of the core 221 has a uniform thickness. Extrusion molding or injection molding forms resin composition as the resistance adjusting layer 222 disposed on the circumferential surface of the core 221. The resistance adjusting layer 222 as a resin layer includes resin as a base material and forms the outermost surface layer of the charging roller 22*a*. Therefore, the fiber bristles of the brush roller 22*b* contact the resistance adjusting layer 222 when the brush roller 22*b* cleans the charging roller 22*a*.

The resistance adjusting layer 222 including the resin as the base material less likely to be deformed with time, easily maintaining the gap between the photoconductor 21 and the charging roller 22*a* within a desired range. The brush roller 22*b* according to an embodiment of the present disclosure can further uniformly clean the charging roller 22*a*, which is described below.

The resistance adjusting layer 222 including the resin as the base material may be expressed as the resistance adjusting layer 222 being made of the resin. The resistance adjusting layer 222 being made of the resin may include conductant. The conductant is added to the resin used as the base material.

The resistance adjusting layer 222 preferably has a JIS-D hardness of 45 degrees or more. The JIS-D hardness is defined by the Japanese Industrial Standards (JIS) K7215 (D hardness). Based on JIS K7215 (D hardness), a durometer is used to measure the JIS-D hardness of the resistance adjusting layer 222. Designing the hardness as described above can prevent deformation of the resistance adjusting layer 222 with time and prevent the gap between the photoconductor 21 and the charging roller 22*a* from changing.

Examples of the resin include a thermoplastic resin. A preferable thermoplastic resin used for the resistance adjusting layer 222 is a material having the JIS-D hardness of 45 degrees or more after the charging roller 22*a* is formed.

Examples of the thermoplastic resin include polymers such as polyethylene (PE), polypropylene (PP), polymethyl methacrylate (PMMA), and polystyrene (PS), copolymers thereof such as acrylonitrile-styrene copolymer (AS), and acrylonitrile-butadiene-styrene copolymer (ABS). These are preferable because they are easy to mold.

The volume resistivity of the resistance adjusting layer 222 is preferably $10^6\Omega\cdot$cm or more and $10^9\Omega\cdot$cm or less. The resistance adjusting layer 222 having the volume resistivity of $10^6\Omega\cdot$cm or more can prevent the occurrence of leakage to the photoconductor 21. The resistance adjusting layer 222 having the volume resistivity of $10^9\Omega\cdot$cm or less can prevent the shortage of a charge amount, and the charging roller 22*a* can sufficiently charge the photoconductor 21 to a charging potential to obtain an image without unevenness.

In terms of charging performance, the resistance adjusting layer 222 is preferably made of a thermoplastic resin composition in which an ion conductive polymer is dispersed. A preferable ion conductive polymer has a volume resistivity of $10^6\Omega\cdot$cm or more and $10^{10}\Omega\cdot$cm or less and can easily reduce the resistance of the resin. Examples of the ion conductive polymers include compounds containing a polyether ester amide component.

Alternatively, a polymer compound containing a quaternary ammonium salt group may also be used as the ion conductive polymer. Examples of the polymer compound containing a quaternary ammonium salt group include a quaternary ammonium salt group containing polyolefin.

The content of the ion conductive polymer can be appropriately selected and can be changed according to the type of the ion conductive polymer.

The resin having 100 parts by weight preferably contains the ion conductive polymer in an amount of 30 parts by weight or more and 70 parts by weight or less when the ion conductive polymer contains the polyether ester amide component. In this case, the volume resistivity of the resistance adjusting layer 222 can be easily adjust to the desired value.

The resin having 100 parts by weight preferably contains the ion conductive polymer in an amount of 10 parts by weight or more and 40 parts by weight or less when the ion conductive polymer contains the polymer compound containing a quaternary ammonium salt group such as the quaternary ammonium salt group containing polyolefin. In this case, the volume resistivity of the resistance adjusting layer 222 can be easily adjust to the desired value.

A kneader such as a twin screw kneader can easily disperse the ion conductive polymer in the thermoplastic resin. Since the ion conductive material is uniformly dispersed in the matrix polymer at a molecular level, the resistance adjusting layer 222 does not have a variation in resistance value due to poor dispersion of the conductive substance, which is observed in the resistance adjusting layer in which the conductive pigment is dispersed.

The ion conductive material that is a polymer compound is uniformly dispersed and fixed in the matrix polymer, and bleed-out is less likely to occur.

The charging roller 22*a* is coupled to a power source, and a predetermined voltage is applied to the charging roller 22*a*. The predetermined voltage may be a direct current (DC) voltage alone. However, the predetermined voltage is preferably obtained by superimposing an alternating current (AC) voltage on the DC voltage. Applying the AC voltage enables more uniformly charging the surface of the photoconductor 21.

The brush roller 22*b* in the present embodiment is described below in detail.

First, the problems in the related art are described.

In the related art, the toner having a small particle diameter and a spherical shape easily passes through a cleaner such as a cleaning blade when the cleaner cleans the electrostatic latent image bearer.

As a result, cleaning failure of the electrostatic latent image bearer is likely to occur in the image forming apparatus using the toner having the small particle diameter and the spherical shape. Even when the lubricant is applied to the electrostatic latent image bearer to enhance cleaning performance, the lubricant may pass through the cleaner and adhere to the charging member such as the charging roller.

Foreign materials such as the toner and the lubricant passing through the cleaner adhere to the charging member and cause abnormal images. This is mainly because amounts of the foreign materials adhered to various positions of the charging member are greatly and locally different, which causes resistance unevenness in the charging member. Points to reduce the resistance unevenness are not only reducing the amount of the foreign materials adhered to the charging member but also uniformly removing the foreign materials from the charging member.

In a technique to clean the charging roller in the prior art, it is not sufficient to uniformly remove the foreign materials adhered to the charging roller. For example, in the brush roller having too thick brush fibers or too high density, the foreign materials are accumulated in a certain portion of the cleaning brush when the bristles in the certain portion of the cleaning brush earlier deteriorates than bristles in the other portions, or a larger amount of foreign materials adhered to the certain portion of the cleaning brush than an amount of foreign materials adhered to the other positions. This is because the same bristle portion of the cleaning brush continuously contacts the same portion of the member to be cleaned in a rotational axis direction of the cleaning brush.

In contrast, the cleaning brush having too fine brush fibers or too low density has too low removal force. To countermeasure the above-described disadvantage, the following configuration may be considered. For example, the charging roller itself is reciprocated by another driver, or another driver rotates the cleaning brush faster than the charging roller. However, the above-described configurations increase the size of the image forming apparatus and the complexity of the image forming apparatus.

The image forming apparatus according to the present embodiment includes the charging roller including the resin layer made of the resin as the outermost surface layer and the cleaning brush roller including fiber bristles, and the brush roller satisfies the following conditions.

$$100 < X < 600 \qquad \text{Expression 1}$$

$$0.2 < Y < 0.6 \qquad \text{Expression 2}$$

where X is a product of a fineness (a unit is deniers) and the density (a unit is kF/inch$^2$) in the fibers of the brush roller, and Y is a value obtained by dividing a biting amount (a unit is mm) of the brush roller with respect to the charging roller by an average of fiber lengths of the fibers in the brush roller (a unit is mm).

Satisfying the above conditions enables uniformly removing the contamination of the toner and the lubricant deposited on the charging roller and preventing the occurrence of the abnormal images mainly including a vertical black streak over a long period of time. The image forming apparatus does not require another driver to uniformly remove the contamination from the charging roller. The above-described simple configuration satisfying the relational expressions can uniformly remove the contamination. For example, another driver for reciprocating the brush roller and the charging roller or another driver for rotating the brush roller faster are not required.

The above-described conditions are described with reference to FIGS. 6 to 9.

Figure 6:
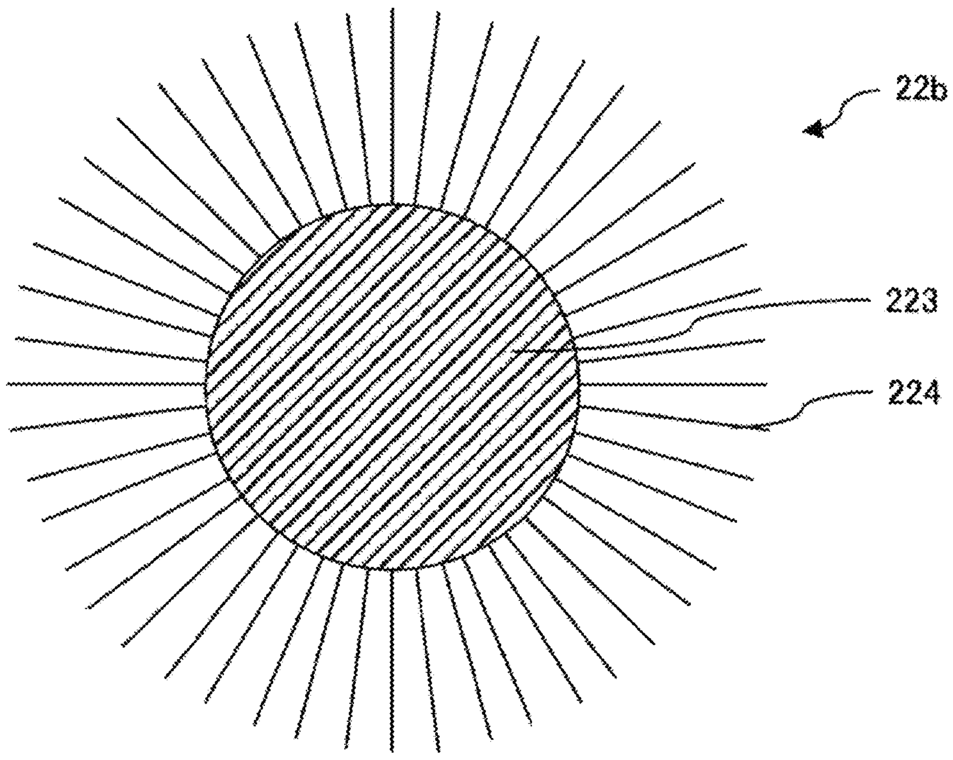
FIG. 6 is a schematic sectional view of a brush roller in the charger of FIG. 4.

FIG. 6 is a schematic sectional view of the brush roller 22*b* in the present embodiment. The brush roller 22*b* in the present example includes a shaft 223 and fiber bristles 224. The fiber bristles may be referred to as brush fibers. The brush roller in the present invention is not limited to the configuration illustrated in FIG. 3. For example, the fiber bristles 224 may be on a member other than the shaft 223, and the member may be on the shaft 223. In this case, a scope of the shaft includes the member. As the shaft 223, for example, a brush core metal may be used, and a brush roller 22*b* may include the fiber bristles 224 disposed on the brush core metal.

The above X is the product of the fineness (the unit is deniers) and the density (the unit is kF/inch$^2$) in the fibers of the brush roller and is a dimensionless value. The density of the fiber bristles may be referred to as a brush bristle density.

The denier is a unit of thickness of fiber and is typically used as a unit of fineness representing the thickness of fiber or yarn. One denier means the thickness of a fiber having a length of 9000 m and a weight of 1 g, and the larger the number, the thicker the fiber.

In the unit of the density, (kF/inch$^2$), "k" represents one thousand, and "kF" represents the number of filaments in the fiber bristles. Therefore, "kF/inch$^2$" is a unit indicating how many thousands of filaments are in one square inches.

Figure 7:
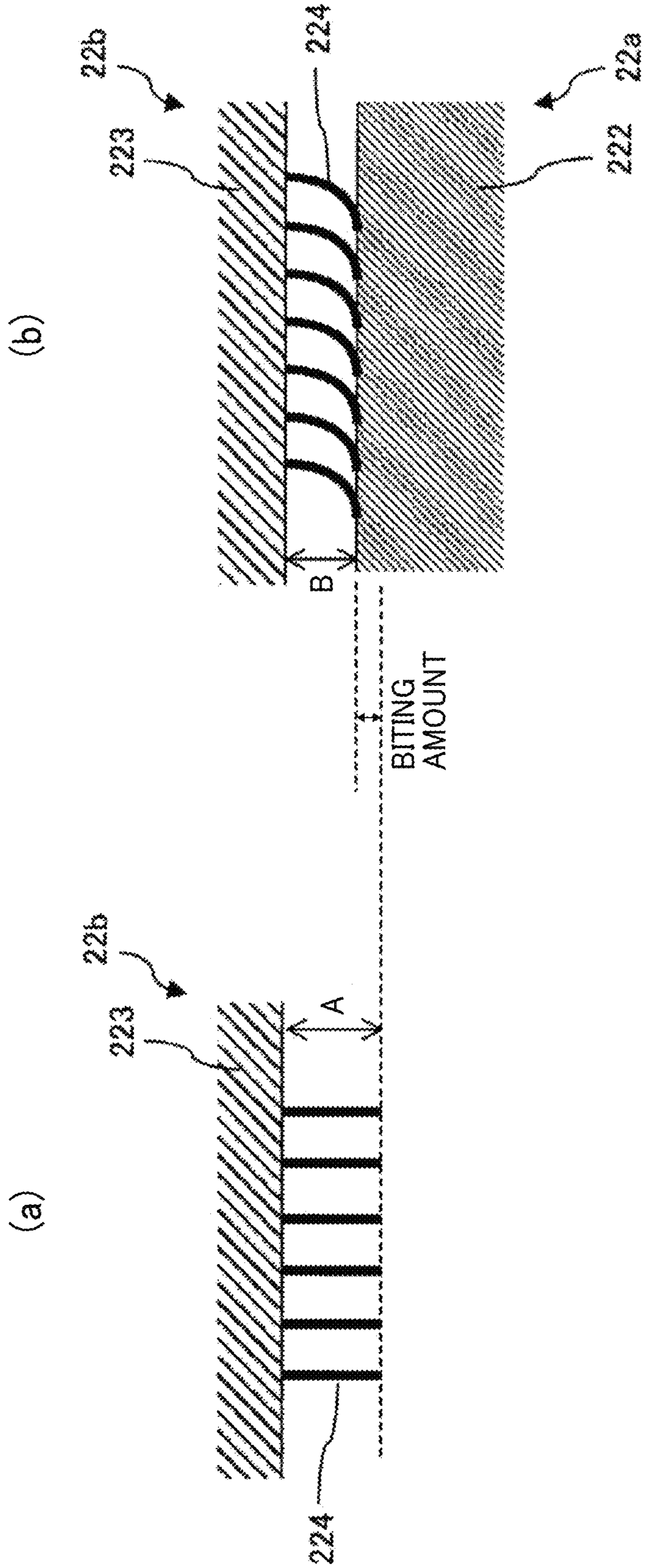
FIG. 7 is a schematic diagram to illustrate a biting amount.

FIG. 7 is a schematic diagram to illustrate the biting amount.

FIG. 7(*a*) is a schematic diagram to illustrate an average value A (mm) of the lengths of the fiber bristles 224. In FIG. 7(*a*), the brush roller 22*b* does not contact the charging roller 22*a*. The average value A of the lengths of the fiber bristles 224 is obtained by subtracting an outer diameter of the shaft 223 from an average value of outer diameters of the brush roller 22*b* measured at 10 or more points in the axial direction. As a measuring instrument, a known roller outer diameter measuring instrument can be used.

In FIG. 7(*b*), the brush roller 22*b* contacts the charging roller 22*a*. The brush roller 22*b* contacts the charging roller 22*a*, and the fiber bristles 224 are bent. There is a gap B between the shaft 223 and the charging roller 22*a*. As described above, the resistance adjusting layer 222 is formed on the outermost face of the charging roller 22*a*. Therefore, the gap B in FIG. 7(*b*) is between the outermost face of the shaft 223 and the outermost face of the resistance adjusting layer 222 (that is the resin layer).

Figure 8:
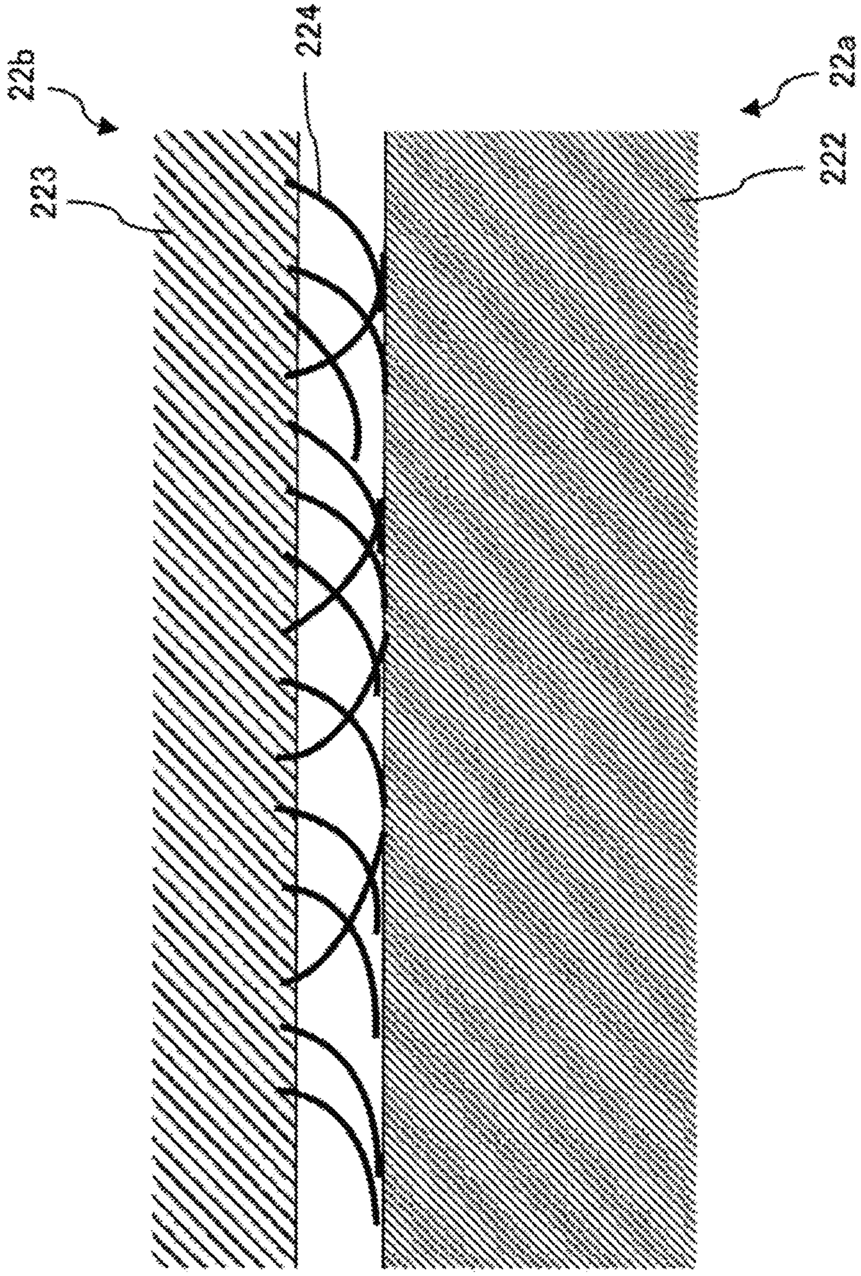
FIG. 8 is a schematic diagram illustrating fiber bristles of the brush roller in contact with the charging roller in the charger of FIG. 4.

In the present embodiment, the fiber bristles contact the charging roller with a certain degree of randomness when the brush roller contacts the charging roller which is described below with reference to FIGS. 8 and 9. In FIG. 7(*b*), deformations of the fiber bristles contacting the charging roller are simplified to illustrate the biting amount. In reality, the fiber bristles deform as illustrated in FIG. 8.

In the present embodiment, the biting amount is defined as follows.

Biting amount=A−B, where A is the average value (mm) of lengths of fiber bristles of a brush roller such as the brush roller 22*b*, and B is the gap (mm) between a charging roller such as the charging roller 22*a* and the shaft of the brush roller contacting the charging roller to clean the charging roller.

The gap B is determined depending on how the brush roller 22*b* is disposed in the charger 22. Adjusting the biasing member such as the pressure spring 19 can adjust the value of the gap B.

The value of Y is obtained by dividing the biting amount (mm) of the brush roller with respect to the charging roller by the average of fiber lengths of the fibers in the brush roller (mm). The above-mentioned Y can be expressed as follows by using the average value A and the gap B in FIG. 7.

$$Y=(A-B)/A$$

The above-described Y is a dimensionless value. The unit of the biting amount of the brush roller with respect to the charging roller and the unit of the average value of the lengths of the fiber bristles are mm, but the unit is not limited to mm.

In the present embodiment, the X and Y satisfy the above relational expressions 1 and 2 as follows.

$$100<X<600,\ 0.2<Y<0.6.$$

The brush roller having the X that is 100 or less has too fine fiber bristles or too sparse fiber bristles and is difficult to remove the foreign materials adhering to the charging roller. The brush roller having the X that is 600 or more has too thick fiber bristles or too dense fiber bristles, and the movement of the fiber bristles is reduced in a region between the brush roller 22*b* and the charging roller 22*a*. The region is also referred to as a nip. For this reason, the fiber bristles are not so different in shape from those when the brush roller does not contact the cleaning target and do not come into random contact with the cleaning target, which varies the removability of dirt (that is the foreign materials adhering to the cleaning target) depending on the position. As a result, the brush roller cannot uniformly remove the dirt from the charging roller 22*a*.

In the charger having the Y that is 0.2 or less, a bending amount of each of fiber bristles is too small, and the brush roller cannot uniformly remove the dirt from the charging roller 22*a*. In the charger having the Y that is 0.6 or more, the fiber bristles become too dense in the nip, and the brush roller cannot uniformly remove the dirt from the charging roller 22*a*.

The brush roller 22*b* satisfying the above relational expressions 1 and 2 in the present embodiment cannot favorably clean the dirt from the charging roller not including the resistance adjusting layer 222 (that is, the resin layer) containing the resin formed as the outermost surface layer. The above-described function in the nip is not exhibited in the charging roller 22*a* made of, for example, an elastomer, that is, not including the outermost surface layer containing the resin. The surface of the charging roller 22*a* made of the elastomer easily traps the fiber bristles and reduces the movement of the fiber bristles. The reason why the dirt is not uniformly removed from the charging roller satisfying the above relational expressions 1 and 2 but being made of the elastomer is presumed that the elastomer prevents the fiber bristles from coming into random contact with the charging roller 22*a*.

For example, it is difficult for the brush roller satisfying the relational expressions 1 and 2 according to the present embodiment to uniformly remove the dirt from the charging roller made of epichlorohydrin rubber as the elastomer that is not the resin.

The brush roller in the present embodiment satisfying the relational expression 1 has a suitable thickness of each of the fiber bristles and a suitable density of the fiber bristles, and the fiber bristles are easily moved in the nip. In addition, in the charger satisfying the relational expression 2, the fiber bristles are appropriately bent in the nip and have a suitable density in the nip, a wide portion of the tip of the fiber bristle can rub the charging roller 22*a* The above-described effects are exhibited in the charging roller including the resistance adjusting layer 222 (that is the resin layer) containing the resin as the outermost face of the charging roller 22*a*. The charging roller 22*a* containing the resin has a hard surface, the fiber bristles easily slip on the surface of the charging roller 22*a*, and the above-described effects are easily exhibited.

FIG. 8 is a schematic diagram schematically illustrating fiber bristles of the brush roller 22*b* according to the present embodiment in contact with the charging roller 22*a*.

In the present embodiment, it is preferable that the fiber bristles of the brush roller actively move in the nip between the charging roller and the shaft of the brush roller. For this purpose, it is preferable that the fineness of the fiber bristle is not too large and the density of the fiber bristle is sparse to some extent. A preferable brush roller in the present embodiment has long fiber bristles easily bent. In addition, when different types of brush rollers are pressed against the charging roller with the same force, the preferable brush roller has a narrower gap between the charging roller and the shaft of the brush roller.

The above-described configuration changes the state of the fiber bristle every time the fiber bristle of the brush roller contacts the surface of the charging roller, and the fiber bristles come into contact with the charging roller with randomness. As a result, the brush roller can remove the foreign materials from the charging roller with randomness and prevent the foreign materials from accumulating on the same place of the charging roller, which prevents the streaky dirt from adhering to the charging roller.

Figure 9:
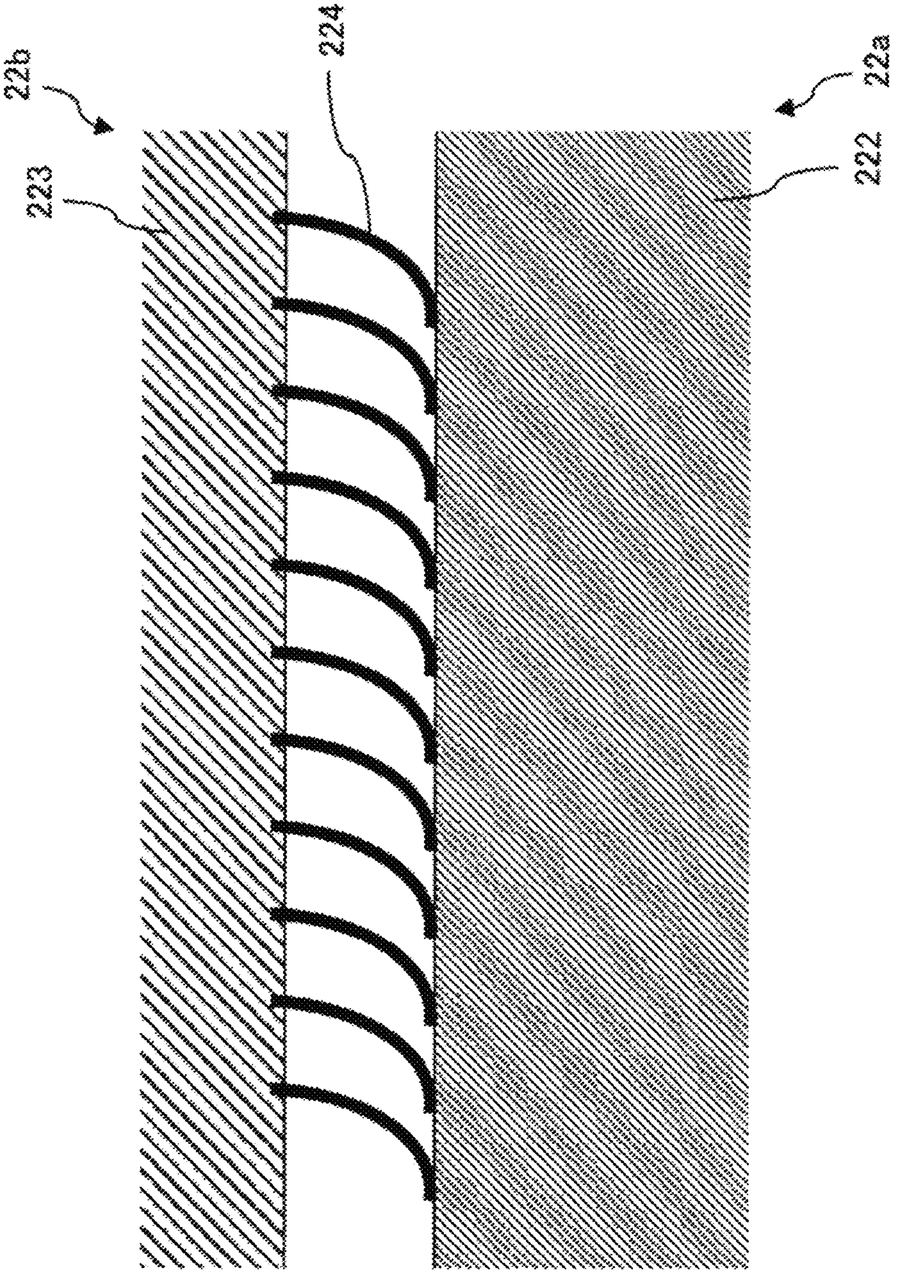
FIG. 9 is a schematic diagram schematically illustrating fiber bristles of the brush roller according to a control sample in contact with the charging roller, which is different from the present invention.

FIG. 9 is a schematic diagram schematically illustrating fiber bristles of the brush roller according to a control sample in contact with the charging roller, which is different from the present invention. The brush roller of the control sample has thick fiber bristles and a high density of the fiber bristles.

As a result, the brush roller of the control sample does not satisfy the above relational expression 1. In the brush roller not satisfying the above relational expression 1, the movement of the fiber bristles in the nip is reduced, and shapes of the fiber bristles do not change much from the shapes of the fiber bristles of the brush roller not in contact with the cleaning target. The fiber bristles do not come into random contact with the charging roller.

Typically, such a configuration is considered advantageous for the removal of dirt. However, in this case, the fiber bristles are difficult to move and remain at the same place, and the same fiber bristles continue to rub the same place. As a result, it is considered that the dirt is accumulated at the same place and the streak is easily generated.

In the present embodiment, the material of the fiber bristles is not limited and can be selected as appropriate. As the material of the fiber bristles, for example, nylon, acrylic, or polyethylene terephthalate (PET) is preferably used. The brush roller made of the above material is easily processed to satisfy the above relational expressions 1 and 2.

The fineness (the unit is denier) of the fiber bristles of the brush roller is preferably 4 denier or less.

The above-described fiber bristles are not excessively thick, are pliable, and are easily bent at random. As a result, the fiber bristles can easily and uniformly remove the dirt from the charging roller.

The average value (mm) of the lengths of the fiber bristles of the brush roller is preferably 1.5 mm or more. The above-described fiber bristles are not excessively short, are pliable, and are easily bent at random. As a result, the fiber bristles can easily and uniformly remove the dirt from the charging roller.

The upper limit of the average value of the fiber lengths of the fiber bristles is not limited. However, the upper limit is preferably 4 mm or less in consideration of the convenience of layout because too long fiber bristles are disadvantageous for the miniaturization of the process cartridge.

As described above, the JIS-D hardness of the resistance adjusting layer 222 is preferably 45 degrees or more. In the charging roller **22*a* including the above-described resistance adjusting layer 222, the gap B (mm) between the shaft 223 of the brush roller 22*b* and the charging roller 22*a*** is less likely to vary over time. As a result, the fiber bristles can easily and uniformly remove the dirt from the charging roller over time.

The surface roughness of the resistance adjusting layer 222 that is the surface roughness of the charging roller **22*a* is preferably equal to or smaller than a ten-point mean roughness Rz of 5 μm or less. The charging roller 22*a* having the above-described surface roughness has an advantage that the fiber bristles of the brush roller are more likely to be randomly bent without being affected by the surface roughness of the charging roller 22*a***.

The following describes experiments and results that examined effects due to the above-described features.

A copier RICOH IIM C5000 manufactured by Ricoh Company, Ltd. was used in the experiments. The copier RICOH IIM C5000 includes process cartridges each having substantially the same configuration as the process cartridge 10 illustrated in FIG. 3. Brush rollers having conditions listed in Table 1 were made. The brush rollers had various finenesses, densities, and fiber bristle lengths as illustrated in Table 1. Each of the brush rollers as the cleaner to clean the charging roller **22*a* was installed in the charger 22** to have the biting amount illustrated in Table 1. As a result, seventeen chargers listed in Table 1 were prepared.

The charging roller of the copier RICOH IIM C5000 was made of hard resins. The main ingredient of the resins was acrylonitrile butadiene styrene (ABS) copolymer.

The charging roller included the resistance adjusting layer formed on the core. The resistance adjusting layer included polyolefin containing quaternary ammonium salt group having 30 parts by weight as ionic conductor polymer with respect to ABS having 100 parts by weight. The volume resistivity of the resistance adjusting layer was $5\times10^{6}\Omega\cdot cm$, and the JIS-D hardness of the resistance adjusting layer was 55 degrees. The surface of the charging roller, that is, the surface of the resistance adjusting laver (that is, the resin layer) had a ten point average roughness Rz of 3.0 μm.

In Table 1, "BRUSH MATERIAL" means the material of the fiber bristles (that is, brush fibers) of the brush rollers, and PET means polyethylene terephthalate. The brush rollers were manufactured by Tsuchiya Co., Ltd. The specification of each brush roller was ordered by the present inventor. In Table 1, the fineness of the brush and the brush bristle density were measured by a manufacturer, and the length of the fiber bristles and the biting amount were measured by the above-described measurement method.

TABLE 1

| | BRUSH MATERIAL | BRUSH FINENESS (deniers) | BRUSH BRISTLE DENSITY (kF/inch$^2$) | AVERAGE VALUE A (mm) of BRUSH FIBER LENGTHS | DISTANCE B (mm) BETWEEN SHAFT AND CHARGING ROLLER |
|---|---|---|---|---|---|
| CONDITION 1 | PET | 2.0 | 100 | 2.5 | 1.5 |
| CONDITION 2 | PET | 3.0 | 150 | 2.5 | 1.5 |
| CONDITION 3 | PET | 2.0 | 60 | 2.5 | 1.5 |
| CONDITION 4 | PET | 4.0 | 30 | 2.5 | 1.5 |
| CONDITION 5 | PET | 4.0 | 140 | 2.5 | 1.5 |
| CONDITION 6 | PET | 2.8 | 200 | 2.5 | 1.5 |
| CONDITION 7 | PET | 2.0 | 60 | 1.5 | 1.15 |
| CONDITION 8 | PET | 2.0 | 60 | 2.5 | 1.95 |
| CONDITION 9 | PET | 2.8 | 200 | 3.5 | 1.5 |
| CONDITION 10 | PET | 2.8 | 200 | 1.5 | 0.65 |
| CONDITION 11 | NYLON | 2.0 | 100 | 2.5 | 1.5 |
| CONDITION 12 | PET | 6.0 | 75 | 2.5 | 1.5 |
| CONDITION 13 | PET | 2.0 | 100 | 1.0 | 0.6 |

TABLE 1-continued

| | | | | | |
|---|---|---|---|---|---|
| CONDITION 14 | PET | 2.0 | 46 | 2.5 | 1.5 |
| CONDITION 15 | PET | 6.0 | 110 | 2.5 | 1.5 |
| CONDITION 16 | PET | 2.0 | 100 | 1.5 | 1.25 |
| CONDITION 17 | PET | 2.0 | 100 | 2.5 | 0.9 |

| | BITING AMOUNT A-B (mm) | PRODUCT X of FINENESS and DENSITY | VALUE Y OBTAINED BY DIVIDING BITING AMOUNT BY FIBER LENGTH |
|---|---|---|---|
| CONDITION 1 | 1.0 | 200 | 0.40 |
| CONDITION 2 | 1.0 | 450 | 0.40 |
| CONDITION 3 | 1.0 | 120 | 0.40 |
| CONDITION 4 | 1.0 | 120 | 0.40 |
| CONDITION 5 | 1.0 | 560 | 0.40 |
| CONDITION 6 | 1.0 | 560 | 0.40 |
| CONDITION 7 | 0.35 | 120 | 0.23 |
| CONDITION 8 | 0.55 | 120 | 0.22 |
| CONDITION 9 | 2.0 | 560 | 0.57 |
| CONDITION 10 | 0.85 | 560 | 0.57 |
| CONDITION 11 | 1.0 | 200 | 0.40 |
| CONDITION 12 | 1.0 | 450 | 0.40 |
| CONDITION 13 | 0.4 | 200 | 0.40 |
| CONDITION 14 | 1.0 | 92 | 0.40 |
| CONDITION 15 | 1.0 | 660 | 0.40 |
| CONDITION 16 | 0.25 | 200 | 0.17 |
| CONDITION 17 | 1.6 | 200 | 0.64 |

The charger having CONDITION 1 in Table 1 was installed in the process cartridge for forming a black image in the copier RICOH IIM C5000, and the following experiment was performed.

In the experiment, black images were printed, and other color images were not printed.

The larger the consumption amount of the lubricant in the process cartridge, the larger the amount of foreign materials adhering to the charging roller. For this reason, a condition of the process cartridge was changed in the experiment to increase the consumption amount of the lubricant 27*a*. Specifically, the pressure of the spring 27*c* of the lubrication device 27 included in the process cartridge 10 was doubled. Under the above-described condition, the copier continuously printed 50000 sheets of black vertical band charts of A4 size in landscape orientation in a low temperature and low humidity (10° C., 15%) environment.

In the experiment, a white image was printed every 50000 sheets so as not to form the black vertical band chart to examine whether a vertical black streak due to contamination of the charging roller occurred on the white image in parts of the sheet in which the black vertical band charts had been continuously printed. In addition, after the white image was printed, the process cartridge was taken out from the image forming apparatus, and streaky contamination generated on the charging roller was examined. Based on the streaky contamination on the charging roller and the vertical black streak on the white image, evaluation was performed according to the following evaluation criteria. The degree of the vertical black streak was ranked into five levels. Rank 3 or higher was regarded as a level acceptable in practical use. Rank 2 or lower was regarded as an unacceptable level.

Evaluation Criteria

5: No streak is observed on both the image and the charging roller.

4: No streak is observed on the image, but five or less streaks are observed on the charging roller.

3: No streak is observed on the image, but six or more streaks are observed on the charging roller.

2: A thin gray streak is observed on the image.

1: A dark black streak is observed on the image.

Regarding each of CONDITIONs 2 to 17, the evaluation was performed in the same manner as in CONDITION 1 except that the charger was changed based on each of CONDITIONs 2 to 17 in Table 1. CONDITIONs 2 to 13 represent embodiments according to the present invention, which is referred to as EMBODIMENTs 2 to 13 in Table2. CONDITIONs 14 to 17 are control samples, which are referred to as CONTROL SAMPLEs 14 to 17 in Table 2.

In addition, a CONTROL SAMPLE 5 was evaluated.

The evaluation was performed in the same manner as in CONDITION 1 except that a rubber roller containing epichlorohydrin rubber as a main ingredient was used as the charging roller. In the control sample 5, the electrical characteristics were adjusted so that the results were not affected by factors other than the surface properties of the charging roller.

The results are listed in Table 2.

TABLE 2

| | CONDITION OF CHARGER | PRODUCT X of FINENESS and DENSITY | VALUE Y OBTAINED BY DIVIDING BITING AMOUNT BY FIBER LENGTH |
|---|---|---|---|
| EMBODIMENT 1 | CONDITION 1 | 200 | 0.40 |
| EMBODIMENT 2 | CONDITION 2 | 450 | 0.40 |
| EMBODIMENT 3 | CONDITION 3 | 120 | 0.40 |
| EMBODIMENT 4 | CONDITION 4 | 120 | 0.40 |

TABLE 2-continued

| | | | |
|---|---|---|---|
| EMBODIMENT 5 | CONDITION 5 | 560 | 0.40 |
| EMBODIMENT 6 | CONDITION 6 | 560 | 0.40 |
| EMBODIMENT 7 | CONDITION 7 | 120 | 0.23 |
| EMBODIMENT 8 | CONDITION 8 | 120 | 0.22 |
| EMBODIMENT 9 | CONDITION 9 | 560 | 0.57 |
| EMBODIMENT 10 | CONDITION 10 | 560 | 0.57 |
| EMBODIMENT 11 | CONDITION 11 | 200 | 0.40 |
| EMBODIMENT 12 | CONDITION 12 | 450 | 0.40 |
| EMBODIMENT 13 | CONDITION 13 | 200 | 0.40 |
| CONTROL SAMPLE 1 | CONDITION 14 | 92 | 0.40 |
| CONTROL SAMPLE 2 | CONDITION 15 | 660 | 0.40 |
| CONTROL SAMPLE 3 | CONDITION 16 | 200 | 0.17 |
| CONTROL SAMPLE 4 | CONDITION 17 | 200 | 0.64 |
| CONTROL SAMPLE 5 | CONDITION 1 | 200 | 0.40 |

| | RANK OF VERTICAL BLACK STREAK | | |
|---|---|---|---|
| | AFTER PRINTING 50000 SHEETS | AFTER PRINTING 100,000 SHEETS | AFTER PRINTING 150000 SHEETS |
| EMBODIMENT 1 | 5 | 5 | 5 |
| EMBODIMENT 2 | 5 | 5 | 5 |
| EMBODIMENT 3 | 5 | 5 | 4 |
| EMBODIMENT 4 | 5 | 5 | 4 |
| EMBODIMENT 5 | 5 | 5 | 4 |
| EMBODIMENT 6 | 5 | 5 | 4 |
| EMBODIMENT 7 | 5 | 4 | 4 |
| EMBODIMENT 8 | 5 | 4 | 4 |
| EMBODIMENT 9 | 5 | 5 | 4 |
| EMBODIMENT 10 | 5 | 4 | 4 |
| EMBODIMENT 11 | 5 | 5 | 5 |
| EMBODIMENT 12 | 5 | 4 | 3 |
| EMBODIMENT 13 | 5 | 4 | 3 |
| CONTROL SAMPLE 1 | 4 | 2 | 1 |
| CONTROL SAMPLE 2 | 4 | 3 | 2 |
| CONTROL SAMPLE 3 | 4 | 3 | 2 |
| CONTROL SAMPLE 4 | 4 | 3 | 2 |
| CONTROL SAMPLE 5 | 3 | 2 | 1 |

As illustrated in Table 2, the black streak in the charger in each of EMBODIMENTs 1 to 13 was the acceptable level over a long period of time.

From the comparison between EMBODIMENT 2 and EMBODIMENT 12, the brush roller having the fineness that is 4 deniers or less can further reduce the contamination of the charging roller for a long time even when the value of X is the same.

From the comparison between EMBODIMENT 1 and EMBODIMENT 13, the brush roller having the fiber length that is 1.5 mm or more can further reduce the contamination of the charging roller for a long time even when the value of Y is the same.

Aspects of the present disclosure are, for example, as follows.

First Aspect

In a first aspect, a process cartridge includes an electrostatic latent image bearer, a charging roller, and a brush roller. The charging roller charges the electrostatic latent image bearer and includes a conductive support and a resin layer covering the conductive support and defining an outermost layer of the charging roller. The brush roller cleans the charging roller and includes fiber bristles. The charging roller and the brush roller satisfy the following relational expressions 1 and 2:

$$100 < X < 600 \quad \text{Expression 1}$$

$$0.2 < Y < 0.6 \quad \text{Expression 2}$$

where X is a product of a fineness (deniers) and a density (kF/inch$^2$) in the fiber bristles, and Y is a value obtained by dividing a biting amount (mm) of the brush roller with respect to the charging roller by an average of fiber lengths (mm) of the fiber bristles.

Second Aspect

In a second aspect, the fineness (denier) of the fiber bristles in the process cartridge according to the first aspect is 4 deniers or less.

Third Aspect

In a third aspect, the average value (mm) of the fiber lengths of the fiber bristles in the process cartridge according to the first aspect or the second aspect is 1.5 mm or more.

Fourth Aspect

In a fourth aspect, a volume resistivity of the resin layer of the charging roller in the process cartridge according to any one of the first to third aspects is $10^6 \Omega\cdot$cm or more and $10^9 \Omega\cdot$cm or less.

Fifth Aspect

In a fifth aspect, the resin layer of the charging roller in the process cartridge according to any one of the first to fourth aspects has a surface having a ten point average roughness Rz of 5.0 μm or less.

Sixth Aspect

In a sixth aspect, a JIS-D hardness of the resin layer of the charging roller in the process cartridge according to any one of the first to fifth aspects is 45 degrees or more.

Seventh Aspect

In a seventh aspect, the resin layer of the charging roller in the process cartridge according to any one of the first to sixth aspects includes ion conductive polymer including at least one of polyether ester amide or polyolefin containing a quaternary ammonium salt group.

Eighth Aspect

In an eighth aspect, the resin of the resin layer of the charging roller in the process cartridge according to any one of the first to seventh aspects includes thermoplastic resin including at least one of polymer of one of:

polyethylene (PE),
polypropylene (PP),
polymethyl methacrylate (PMMA), or
polystyrene (PS):
copolymers of at least two of:
polyethylene (PE),
polypropylene (PP),
polymethyl methacrylate (PMMA), or
polystyrene (PS);
acrylonitrile-styrene copolymer (AS); or acrylonitrile-butadiene-styrene copolymer (ABS).

Ninth Aspect

In a ninth aspect, the fiber bristles of the brush roller in the process cartridge according to any one of the first to eighth aspects include at least one of nylon, acrylic, or polyethylene terephthalate (PET).

Tenth Aspect

In a tenth aspect, an image forming apparatus includes the process cartridge according to any one of the first to ninth aspects and a sheet feeder to feed a sheet to the process cartridge.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A process cartridge comprising:

an electrostatic latent image bearer;

a charging roller to charge the electrostatic latent image bearer, the charging roller including:

a conductive support; and a resin layer covering the conductive support and defining an outermost surface layer of the charging roller; and a brush roller to clean the charging roller, the brush roller including fiber bristles, wherein the charging roller and the brush roller satisfy following relational expressions 1 and 2:

$$200 \leq X < 600 \quad \text{Expression 1}$$

$$0.4 \leq Y < 0.6 \quad \text{Expression 2}$$

where X is a product of a fineness (deniers) and a density (kF/inch$^2$) in the fiber bristles, and Y is a value obtained by dividing a biting amount (mm) of the brush roller with respect to the charging roller by an average (mm) of fiber lengths of the fiber bristles.

2. The process cartridge according to claim 1,
wherein the fineness (deniers) in the fiber bristles is 4 deniers or less.

3. The process cartridge according to claim 1,
wherein the average (mm) of the fiber lengths of the fiber bristles is 1.5 mm or more.

4. The process cartridge according to claim 1,
wherein a volume resistivity of the resin layer is $10^6 \Omega\cdot$cm or more and $10^9 \Omega\cdot$cm or less.

5. The process cartridge according to claim 1,
wherein the resin layer has a surface having a ten point average roughness Rz of 5.0 μm or less.

6. The process cartridge according to claim 1,
wherein a JIS-D hardness of the resin layer is 45 degrees or more.

7. The process cartridge according to claim 1,
wherein the resin layer includes ion conductive polymer including at least one of polyether ester amide or polyolefin containing a quaternary ammonium salt group.

8. The process cartridge according to claim 1,
wherein the resin layer is made of thermoplastic resin containing at least one of:
polymer of one of:
polyethylene (PE),
polypropylene (PP),
polymethyl methacrylate (PMMA), or
polystyrene (PS);
copolymers of at least two of:
polyethylene (PE),
polypropylene (PP),
polymethyl methacrylate (PMMA), or
polystyrene (PS);
acrylonitrile-styrene copolymer (AS); or
acrylonitrile-butadiene-styrene copolymer (ABS).

9. The process cartridge according to claim 1,
wherein the fiber bristles include at least one of nylon, acrylic, or polyethylene terephthalate (PET).

10. An image forming apparatus comprising:
the process cartridge according to claim 1; and
a sheet feeder to feed a sheet to the process cartridge.

11. The process cartridge according to claim 1, wherein the charging roller and the brush roller satisfy following relational expressions 3 and 4:

$$200 \leq X \leq 450 \quad \text{Expression 3}$$

$$Y = 0.4 \quad \text{Expression 4}$$

where X is a product of a fineness (deniers) and a density (kF/inch$^2$) in the fiber bristles, and Y is a value obtained by dividing a biting amount (mm) of the brush roller with respect to the charging roller by an average (mm) of fiber lengths of the fiber bristles.

* * * * *